(12) United States Patent
Kumagai et al.

(10) Patent No.: US 8,957,650 B2
(45) Date of Patent: Feb. 17, 2015

(54) STEP-UP/DOWN DC-DC CONVERTER AND SWITCHING CONTROL CIRCUIT

(75) Inventors: Keizo Kumagai, Atsugi (JP); Takashi Hiroshima, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 251 days.

(21) Appl. No.: 13/575,731

(22) PCT Filed: Jan. 17, 2011

(86) PCT No.: PCT/JP2011/050629
§ 371 (c)(1),
(2), (4) Date: Jul. 27, 2012

(87) PCT Pub. No.: WO2011/093156
PCT Pub. Date: Aug. 4, 2011

(65) Prior Publication Data
US 2012/0286749 A1 Nov. 15, 2012

(30) Foreign Application Priority Data
Jan. 28, 2010 (JP) .................................. 2010-016119

(51) Int. Cl.
*G05F 1/00* (2006.01)
*H02M 3/158* (2006.01)
*H02M 3/156* (2006.01)

(52) U.S. Cl.
CPC ............ *H02M 3/1582* (2013.01); *H02M 3/156* (2013.01)
USPC .......................................... 323/282; 323/271

(58) Field of Classification Search
CPC .......... H02M 3/156; H02M 3/157; G05F 1/10
USPC ................................. 323/259, 271, 282–285
See application file for complete search history.

(56) References Cited

U.S. PATENT DOCUMENTS 5,402,060 A 3/1995 Erisman
6,147,549 A 11/2000 Ohno (Continued)

FOREIGN PATENT DOCUMENTS

JP 5-161029 A 6/1993
JP 7-143742 A 6/1995

(Continued)

OTHER PUBLICATIONS

International Search Report dated Apr. 19, 2011 issued in International Appln. No. PCT/JP2011/050629.

(Continued)

*Primary Examiner* — Timothy J Dole
*Assistant Examiner* — Shahzeb K Ahmad
(74) *Attorney, Agent, or Firm* — Holtz, Holtz, Goodman & Chick PC (57) ABSTRACT

A step-up/down DC-DC converter and switching control circuit are described. According to one implementation, a switching control circuit generates an on/off signal of a first switching device supplying a current to a voltage conversion inductor of a step-up/down DC-DC converter and a second switching device receiving the current from the inductor. The switching control circuit includes an error amplifier circuit, an inverting amplifier circuit, a waveform generator circuit, a first voltage comparator circuit, a second voltage comparator circuit, and a peak-value detector circuit. The peak-value detector circuit detects a peak value of triangle waves generated at the waveform generator circuit and supplies a voltage corresponding to the peak value to the inverting amplifier circuit as a reference voltage.

6 Claims, 4 Drawing Sheets

(56) References Cited

U.S. PATENT DOCUMENTS

| | | | |
|---|---|---|---|
| 6,600,295 B2 * | 7/2003 | Kanekawa et al. | 323/222 |
| 7,180,274 B2 * | 2/2007 | Chen et al. | 323/222 |
| 7,518,349 B2 | 4/2009 | Xu | |
| 7,570,033 B1 | 8/2009 | Ju | |
| 7,737,668 B2 | 6/2010 | Oswald et al. | |
| 8,436,598 B2 * | 5/2013 | Miyamae | 323/282 |
| 2004/0207375 A1 | 10/2004 | Umemoto et al. | |
| 2005/0007089 A1 | 1/2005 | Niiyama et al. | |
| 2007/0057650 A1 | 3/2007 | Umemoto et al. | |
| 2007/0075687 A1 | 4/2007 | Ishii et al. | |
| 2007/0120546 A1 | 5/2007 | Hagino | |
| 2008/0116868 A1 | 5/2008 | Nishida | |
| 2009/0102440 A1 | 4/2009 | Coles | |
| 2009/0134860 A1 | 5/2009 | Umemoto et al. | |
| 2012/0299568 A1 * | 11/2012 | Kumagai et al. | 323/282 |

FOREIGN PATENT DOCUMENTS

| | | | |
|---|---|---|---|
| JP | 3440314 B2 | | 6/1995 |
| JP | 2005033862 | * | 7/2003 |
| JP | 3953443 B2 | | 5/2007 |
| JP | 2008-131746 A | | 6/2008 |
| JP | 2009-124877 A | | 6/2008 |

OTHER PUBLICATIONS

English translation of an International Preliminary Report on Patentability (IPRP) including Written Opinion dated Jul. 31, 2012, in parent International Application No. PCT/JP2011/050629.

Related U.S. Appl. No. 13/575,713; First Named Inventor: Keizo Kumagai; Title: "Step-Up/Down DC-DC Converter and Switching Control Circuit"; filed Jul. 27, 2012.

* cited by examiner

STEP-UP/DOWN DC-DC CONVERTER AND SWITCHING CONTROL CIRCUIT

This application is a U.S. National Phase Application under 35 USC 371 of International Application PCT/JP2011/050629, filed Jan. 17, 2011.

TECHNICAL FIELD

The present invention relates to a DC-DC converter that converts a DC voltage and a control circuit thereof and, in particular, relates to a technology that is effectively applicable to a step-up/down DC-DC converter that can step up or down an input voltage and then output the converted voltage.

BACKGROUND ART

DC-DC converters that convert a variable DC input voltage to a DC voltage of a predetermined electric potential and outputs the converted DC voltage include step-up/down DC-DC converters that can step up or down an input voltage and output the converted DC voltage. Inventions on such conventional step-up/down DC-DC converters are described in, for example, Patent Documents 1 and 2.

Figure 8:
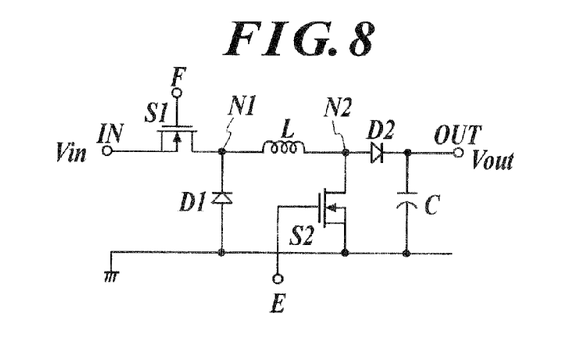
FIG. 8 is a circuit configuration diagram illustrating an example configuration of the step-up/down DC-DC converter.

FIG. 8 illustrates the configuration of a step-up/down DC-DC converter disclosed in Patent Document 1. This step-up/down DC-DC converter has a switching device S1, an inductor (coil) L, and a rectifying diode D2 that are connected in series between an input terminal IN receiving a DC voltage Vin supplied from a DC source, such as a battery, and an output terminal OUT. A diode D1 is inversely connected to an input terminal (node N1) of the inductor L and a grounding point, and a switching device S2 is connected to an output terminal (node N2) of the inductor L and a grounding point.

Figure 9:
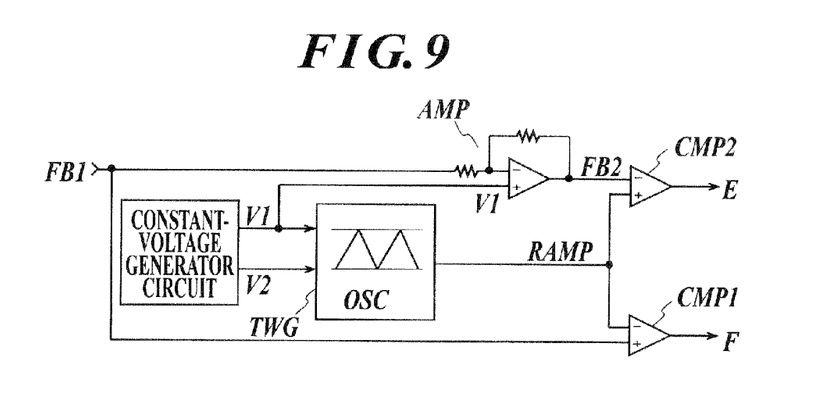
FIG. 9 is a circuit configuration diagram illustrating an example configuration of a switching control circuit of a conventional step-up/down DC-DC converter.

As illustrated in FIG. 9, a control circuit that turns on/off the switching devices S1 and S2 includes a triangle-wave generator circuit TWG that generates triangle waves used for PWM (pulse width modulation) control of the output voltage, an inverting amplifier AMP that inverts a feedback voltage FB1, and paired PWM comparators CMP1 and CMP2 that receive the triangle waves and the feedback voltage FB1 or an inverted voltage FB2 thereof. If the input voltage Vin is higher than a target output voltage, i.e., if the feedback voltage FB1 is lower than the peak voltage V1 of the triangle waves, the switching device S2 enters a continuous OFF state while the switching device S1 is driven by PWM pulses to output a voltage Vout that is obtained by stepping down the Vin. If the input voltage Vin is lower than the target output voltage, i.e., if the feedback voltage FB1 is higher than the peak voltage V1 of the triangle waves, the switching device S1 enters a continuous ON state while the switching device S2 is driven by PWM pulses to output a voltage Vout that is obtained by stepping up the Vin.

PRIOR ART DOCUMENT

Patent Document

Patent Document 1: Japanese Patent No. 3440314
Patent Document 2: Japanese Patent No. 3953443

DISCLOSURE OF INVENTION

Problems to be Solved by the Invention

In a step-up/down DC-DC converter, an upper limit voltage V1 defining the peak value of the triangle waves and a lower limit voltage V2 defining the bottom value of the triangle waves are supplied to a triangle-wave generator circuit TWG that generates triangle waves, and the triangle-wave generator circuit TWG generates triangle waves using the upper limit voltage V1 and the lower limit voltage V2. The triangle-wave generator circuit TWG may include a charging/discharging circuit that has a constant current source and a capacitor and a comparator that generates timing signals for charging/discharging switching on the basis of a comparison voltage of the upper limit voltage V1 and lower limit voltage V2.

Figure 10:
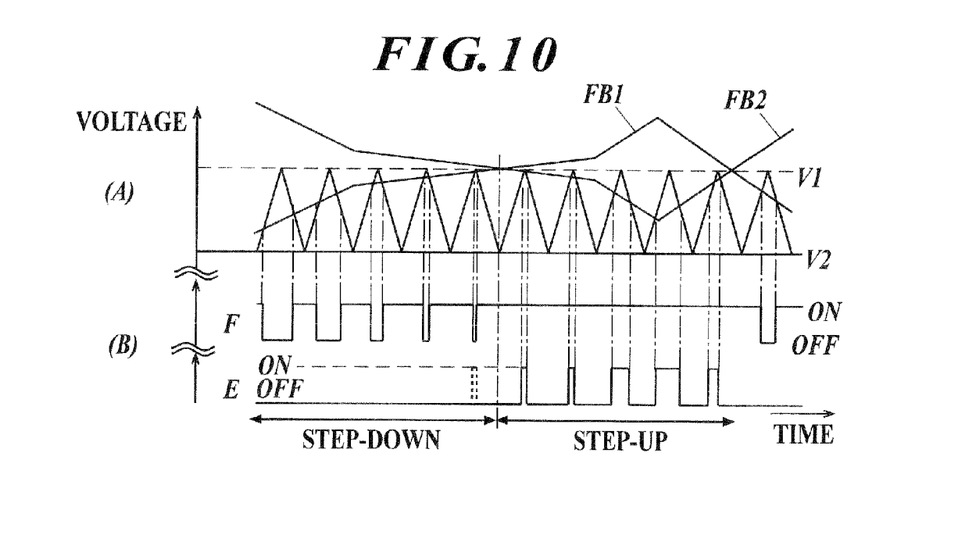
FIG. 10 is a waveform diagram illustrating a variation in signals from and electric potentials across various units of the switching control circuit of the conventional step-up/down DC-DC converter shown in FIG. 9.

The step-up/down DC-DC converter disclosed in Patent Document 1 directly supplies the upper limit voltage V1 that is supplied to the triangle-wave generator circuit TWG to an inverting amplifier AMP as a reference voltage. Supply of such an upper limit voltage V1 as a reference voltage causes the inverting amplifier AMP to generate a voltage FB2 by inversion of the feedback voltage FB1 with reference to the voltage V1 and to supply this to a step-up side PWM comparator CMP2, as illustrated in FIG. 10A.

However, direct supply of the upper limit voltage V1 defining the peak value of the triangle waves as a reference voltage for the inverting amplifier AMP causes the peak value of actual triangle waves to exceed the upper limit voltage V1 due to delay and other conditions in the comparator of the triangle-wave generator circuit. As a result, pulses that turn on the step-up switching device S2 are output at a timing when the switching device S2 is not required to be turned on, as shown by the dotted line in FIG. 10B, and a large amount of useless current is supplied.

An object of the present invention, which has been conceived in light of the issue described above, is to provide a step-up/down DC-DC converter including a circuit generating triangle waves for PWM control of an output voltage, a PWM comparator, and an inverting amplifier inverting a feedback voltage and reducing the amount of useless current due to a time lag between the peak value of a triangle wave and the reference voltage of the inverting amplifier so as to improve the power efficiency.

Means for Solving the Problem

In order to achieve the above object, there is provided a switching control circuit generating and outputting an on/off signal of a first switching device supplying a current to a voltage conversion inductor of a step-up/down DC-DC converter and a second switching device receiving the current from the inductor, the switching control circuit including:

an error amplifier circuit outputting a voltage corresponding to an output voltage of the DC-DC converter;

an inverting amplifier circuit inverting the output from the error amplifier circuit with reference to a predetermined voltage;

a waveform generator circuit generating triangle waves; a first voltage comparator circuit receiving the output from the error amplifier circuit and the output from the waveform generator circuit;

a second voltage comparator circuit receiving the output from the inverting amplifier circuit and the output from the waveform generator circuit; and a peak-value detector circuit detecting a peak value of the triangle waves generated at the waveform generator circuit and supplying a voltage corresponding to the peak value to the inverting amplifier circuit as a reference voltage.

Through such a solution, the peak value of actual triangle waves generated at a waveform generator circuit is detected, a voltage corresponding to the detected peak value is supplied to an inverting amplifier circuit as a reference voltage, and the inverting amplifier circuit inverts the output of an error amplifier circuit; thus, the reference voltage of the inverting amplifier circuit falls below the peak value of the triangle waves to prevent a large amount of useless current to be supplied as a result of the output of a pulse that turns on the switching device of the DC-DC converter at a timing when the switching device is not required to be turned on.

Preferably, the peak-value detector circuit includes a voltage averaging circuit extracting an average voltage of the triangle waves generated at the waveform generator circuit and a multiplying circuit amplifying the voltage extracted by the voltage averaging circuit by a predetermined factor. In this way, a relatively simple circuit can set the reference voltage supplied to the inverting amplifier circuit at a voltage corresponding to the peak value of actual triangle waves.

Preferably, the waveform generating circuit includes a constant current source, a first current mirror circuit and a second current mirror circuit supplying currents proportional to a constant current from the constant current source, a first capacitive element charged by a current from the first current mirror circuit, a second capacitive element charged by a current from the second current mirror circuit, first discharging means for discharging an electric charge in the first capacitive element, and second discharging means for discharging an electric charge in the second capacitive element, wherein a waveform signal supplied to the first voltage comparator circuit and the second voltage comparator circuit is generated from the charging voltage of the first capacitive element, and a voltage corresponding to the peak value that is generated by supplying the charging voltage of the second capacitive element to the peak-value circuit is supplied to the inverting amplifier circuit as a reference voltage. Such a circuit configuration can separately generate a waveform signal (triangle waves) used in PWM control and a signal supplied to the peak-value detector circuit to generate a reference voltage to be supplied to the inverting amplifier circuit, facilitating setting of the relationship between peak values of two signals.

Preferably, the output current from the first current mirror circuit is identical to the output current from the second current mirror circuit, the capacitance of the second capacitive element is set to be smaller than the capacitance of the first capacitive element, and the peak value of the charging voltage of the second capacitive element supplied to the peak-value detector circuit is set to be larger than the peak value of a waveform signal supplied to the first voltage comparator circuit and the second voltage comparator circuit. In this way, the peak value of the signal supplied to the peak-value detector circuit can be set to be larger than the peak value of a waveform signal supplied to a first voltage comparator circuit and a second voltage comparator circuit by merely setting different capacitances to the two capacitive elements.

Preferably, the capacitance of the first capacitive element is identical to the capacitance of the second capacitive element, the output current of the first current mirror circuit is set to be smaller than the output current of the second current mirror circuit, and the peak value of the charging voltage of the second capacitive element supplied to the peak-value detector circuit is set to be higher than the peak value of a waveform signal supplied to the first voltage comparator circuit and the second voltage comparator circuit. Thereby, the peak value of a signal supplied to the peak-value detector circuit can be set to be larger than the peak value of the waveform signal supplied to the first voltage comparator circuit and the second voltage comparator circuit by merely setting different output currents to the two current mirror circuits.

Preferably, the output current from the first current mirror circuit is identical to the output current from the second current mirror circuit, and the capacitance of the second capacitive element is set to be identical to the capacitance of the first capacitive element, the multiplying circuit includes an operational amplifier receiving a voltage extracted by the voltage averaging circuit at a non-inverting input terminal and a divider circuit connected to an output terminal of the operational amplifier and a reference potential point, and the voltage divided at the divider circuit is applied to an inverting input terminal of the operational amplifier, and the input voltage to the operational amplifier is amplified to a voltage that is slightly higher than two times of the input voltage such that the peak value of the charging voltage of the second capacitive element supplied to the peak-value detector circuit is set to be larger than the peak value of a waveform signal supplied to the first voltage comparator circuit and the second voltage comparator circuit. As a result, at a dividing circuit including two resistive elements connected in series, the peak value of a signal supplied to the peak-value detector circuit can be set to be larger than the peak value of a waveform signal supplied to the first voltage comparator circuit and the second voltage comparator circuit by merely setting different resistances to the resistive elements.

Preferably, a step-up/down DC-DC converter includes: a voltage conversion inductor; a first switching device supplying a current to the inductor; a second switching device receiving a current from the inductor; a first rectifying device rectifying a current from the inductor while the first switching device is being turned off; a second rectifying device rectifying the current from the inductor while the second switching device is being turned off; and a switching control circuit generating a signal for turning on/off the first and second switching devices. The DC-DC converter accordingly can supply a small amount of useless currents and exhibit excellent power efficiency.

Advantageous Effect of the Invention

According to the present invention, the step-up/down DC-DC converter including a circuit generating triangle waves for PWM control of an output voltage, a PWM comparator, and an inverting amplifier inverting a feedback voltage is advantageous in that a voltage having relatively high precision in response to lag and variation in peak value of the triangle waves can be generated as a reference voltage supplied to the inverting amplifier, and the amount of useless currents can be reduced to improve the power efficiency.

EMBODIMENT FOR CARRYING OUT THE INVENTION

Preferred embodiments of the present invention will now be described with reference to the drawings.

Figure 1:
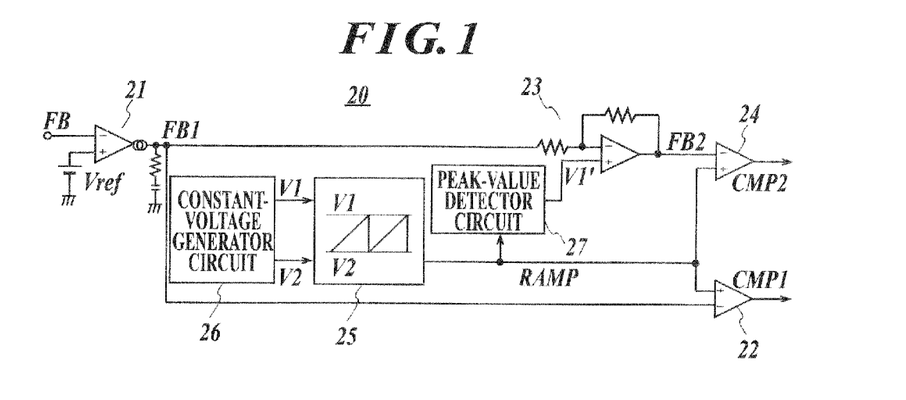
FIG. 1 is a circuit configuration diagram illustrating an embodiment of a switching control circuit of a step-up/down DC-DC converter according to the present invention.

FIG. 1 illustrates an embodiment of a switching control circuit of a step-up/down DC-DC converter according to the present invention. A circuit operating in response to a control signal output from the switching control circuit may have substantially the same configuration as that illustrated in FIG. 8; thus, a drawing thereof is omitted. In the description below, the control circuit in FIG. 1 includes a P-channel MOSFET in place of the switching device S1 and an N-channel MOSFET in place of S2 in the circuit in FIG. 8.

The switching control circuit 20 of the embodiment in FIG. 1 includes an error amplifier 21 functioning as an error amplifier circuit that outputs a voltage FB1 corresponding to a potential difference between a reference voltage Vref1 and a feedback voltage FB divided by a bleeder resistor (not shown) dividing an output voltage Vout from the DC-DC converter; a first comparator 22 that receives the output FB1 from the error amplifier 21, at an inverting input terminal; an inverting amplifier 23 functioning as an inverting amplifier circuit that inverts the output FB1 from the error amplifier 21; and a second comparator 24 that receives a voltage FB2 inverted by the inverting amplifier 23, at an inverting input terminal.

The switching control circuit 20 further includes a waveform generator circuit 25 that generates serrated waveform signals RAMP as triangle waves to be input to non-inverted input terminals of the first comparator 22 and second comparator 24; a constant voltage circuit 26 that generates an upper limit voltage V1 and a lower limit voltage V2 of the waveform signals RAMP generated at the waveform generator circuit 25; and a peak-value detector circuit 27 that detects the peak value of the waveform signals RAMP generated at the waveform generator circuit 25, wherein the peak value voltage detected at the peak-value detector circuit 27 is supplied to the inverting amplifier 23 as an inverted reference voltage V1'.

The first comparator 22 and the second comparator 24 compare the waveform signals RAMP and the output FB1 or its inverted voltage FB2 from the error amplifier 21 outputting a voltage corresponding to the feedback voltage FB to generate and output PWM pulses having a pulse width corresponding to the feedback voltage FB. Although not shown in FIG. 1, the outputs from the first comparator 22 and the second comparator 24 are applied to the gate terminals of the MOSFETs (insulated gate field effect transistors) of the switching devices S1 and S2 of the step-up/down DC-DC converter, which is illustrated in FIG. 8, to turn on/off the S1 and S2.

Specifically, if the input voltage Vin is higher than the target output voltage, the output of the second comparator 24 is set at a continuous low level to turn off the switching device S2, while PWM pulses are output from the first comparator 22 to turn on/off the switching device S1. While the switching device S1 is being turned on, energy is accumulated by applying a current to the coil L as an inductor. When the S1 is turned off, the energy accumulated in the coil L is discharged such that a current is applied to a smoothing capacitor C via a diode D2. By repeating this, the input voltage Vin is stepped down to be output as a voltage Vout. If the input voltage Vin falls below the target output voltage, the output of the first comparator 22 is set at a continuous low level causing the switching device S1 to enter a continuous on state, while PWM pulses are output from the second comparator 24 to turn on/off the switching device S2. In this way, the Vin is stepped up to be output as a voltage Vout.

A synchronous rectification type step-up/down DC-DC converter is also known that includes switching devices that turn on/off complementarily with the S1 and S2 in place of the diodes D1 and D2 illustrated in FIG. 8. In such a case, an N-channel MOSFET is used as a switching device in place of the diode D1 and a P-channel MOSFET is used as a switching device in place of the diode D2 such that the same signals as the S1 and S2 are applied to the gate terminals.

Although not particularly limited, the control circuit 20, the switching transistors (S1 and S2), and the diodes (D1 and D2), which are illustrated in FIG. 1, may constitute a semiconductor integrated circuit (power driving IC), and the coil L as an inductor and the smoothing capacitor C1 may function as external devices to be connected to external terminals of the IC.

Figure 2:
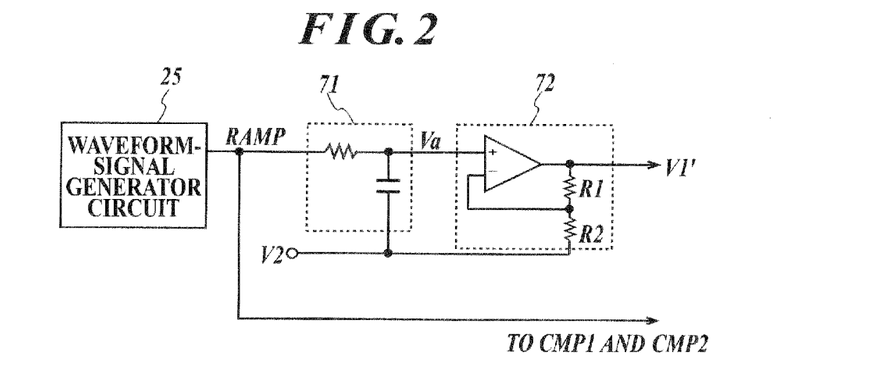
FIG. 2 is a circuit configuration diagram illustrating an example configuration of a peak-value detector circuit of the switching control circuit according to the embodiment in FIG. 1.

FIG. 2 illustrates an example configuration of the peak-value detector circuit 27 for waveform signals RAMP (hereinafter, referred to as triangle waves) of the switching control circuit 20 according to this embodiment.

As illustrated in FIG. 2, the peak-value detector circuit 27 includes a voltage averaging circuit 71 having a low-pass filter that receives the triangle waves RAMP and outputs a voltage Va corresponding to the average voltage of the triangle waves RAMP and a multiplying circuit 72 that multiplies the output of the voltage averaging circuit 71 by a predetermined factor and outputs the outcome. The multiplying circuit 72 includes an operational amplifier AMP1 that receives the output voltage Va from the voltage averaging circuit 71, at the non-inverting input terminal and resistors R1 and R2 that are connected in series to the output terminal of the operational amplifier AMP1 and the constant voltage terminal to which the lower limit voltage V2 is applied, the voltage divided at the resistors R1 and R2 being fed back to the non-inverting input terminal of the operational amplifier AMP1.

Figure 3:
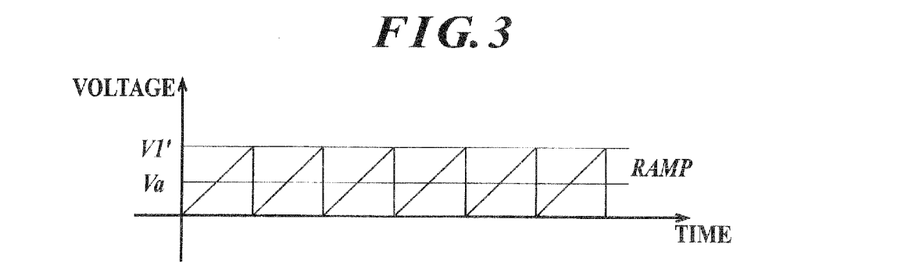
FIG. 3 is a waveform diagram illustrating the relationship between the input and output of the peak-value detector circuit in FIG. 2.

Such a multiplying circuit 72 outputs a voltage that matches the electric potential at the connection node of the resistors R1 and R2 to the input voltage Va of the non-inverting input terminal in response to imaginary short-circuiting at the operational amplifier AMP1. That is, a voltage acquired by multiplying Va by $\{(R1+R2)/R2\}$ is output. In this embodiment, the resistances of the resistors R1 and R2 are set the same such that a voltage 2Va that is twice the output voltage Va from the filter circuit 71 is generated and such that this is supplied to the inverting amplifier 23 as a reference voltage V1', as illustrated in FIG. 3.

Figure 4:
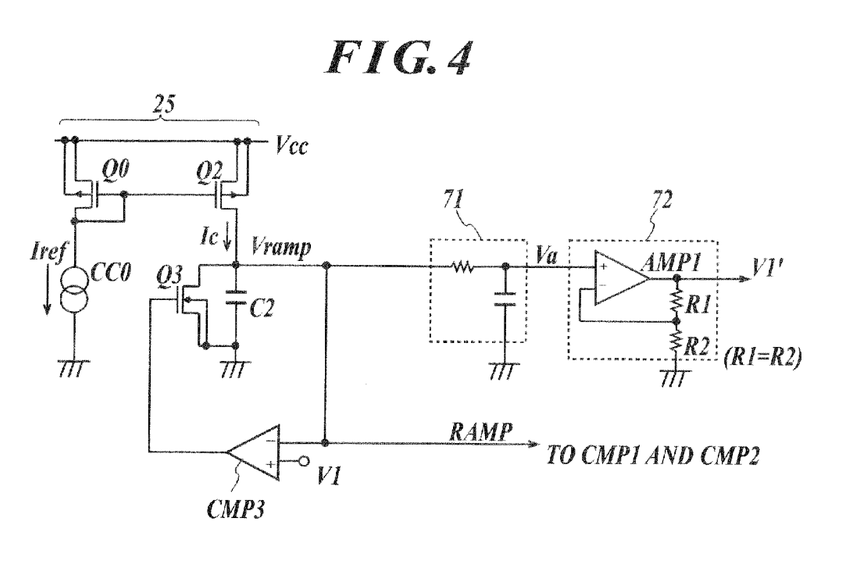
FIG. 4 is a circuit diagram illustrating a first example of a waveform (triangle wave) generator circuit of the peak-value detector circuit according to an embodiment.

FIG. 4 illustrates a first specific example of the waveform generator circuit 25 generating triangle waves, the voltage averaging circuit 71, and the multiplying circuit 72. The voltage averaging circuit 71 and the multiplying circuit 72 are the same as those illustrated in FIG. 2. FIG. 4 illustrates a case where the lower limit voltage V2 is the grounding potential.

The waveform generator circuit 25 includes a constant current source CC0 that supplies a reference current Iref, a P-channel MOS transistor Q0 that is connected in series with the constant current source CC0, a P-channel MOS transistor Q2 that is in common connection with the transistor Q0 at their gates, a capacitive element C2 that is connected to the drain terminal of the transistor Q2 and the grounding point, and an N-channel MOS transistor Q3 that is connected in parallel with the capacitive element C2. The transistor Q0 has a diode connection joining the gate and the drain and converts the current Iref from the constant current source CC0 to a voltage.

Figure 5A:
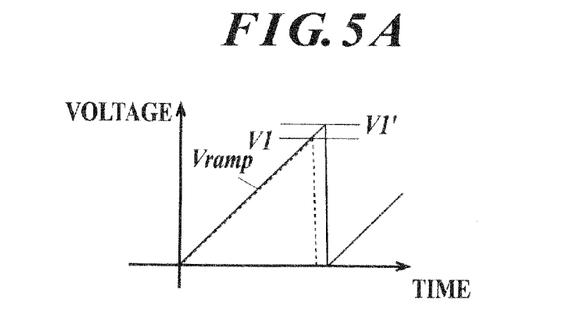
FIG. 5A is a waveform diagram illustrating an enlarged output waveform from the waveform (triangle wave) generator circuit of the first example.

The gate terminal of the transistor Q2 receives a gate voltage from the transistor Q0 and the transistor Q2 functions as a current mirror circuit that generates a current proportional to the current Iref corresponding to the size ratio (W/L ratio) of the transistors Q0 and Q2. The constant current Ic generated at the current mirror circuit is charged to the capacitive element C2, causing the voltage Vramp of the capacitive element C2 to increase at a constant rate, as illustrated in FIG. 5A. The constant current source CC0 and the current mirror circuit (Q0 and Q2) may be considered to be a constant current circuit.

Figure 5B:
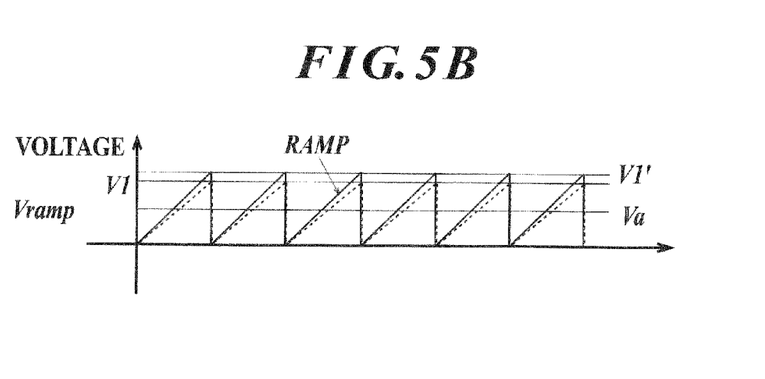
FIG. 5B is a waveform diagram illustrating an output waveform from the waveform (triangle wave) generator circuit.

The voltage Vramp of the capacitive element C2 is compared to the constant voltage V1 by the comparator CMP3. Upon the Vramp reaching the V1, the output from the comparator CMP3 varies from a low level to a high level. In response, the transistor Q3 enters an on state, and the electricity of the capacitive element C2 is discharged, causing the voltage Vramp of the capacitive element C2 to suddenly fall to the grounding potential. In this way, the output of the comparator CMP3 changes from a high level to a low level such that the transistor Q3 enters an off state; thus, the capacitive element C2 is charged by the constant current Ic again, and the voltage Vramp of the capacitive element C2 rises. By repeating this, serrated waves (triangle waves) RAMP are generated, as illustrated in FIG. 5B.

During such charging/discharging, a delay inevitably occurs in the comparison by the comparator CMP3. Thus, in an actual case, the voltage Vramp does not decrease to the grounding potential when the voltage Vramp reaches the constant voltage V1, but decreases when the voltage Vramp reaches a voltage V1' slightly higher than V1. That is, the peak value of the triangle waves RAMP supplied to the PWM comparators CMP1 and CMP2, which are illustrated in FIG. 1, is V1', not V1.

Accordingly, in this embodiment, the voltage V1' obtained by averaging the charging voltage Vramp of the capacitive element C2 at the voltage averaging circuit 71 and doubling the averaged voltage at the multiplying circuit 72 is supplied to the inverting amplifier 23 as an inverted reference voltage; thus, a feedback voltage FB based on a reference voltage having a relatively high precision compared to when the constant voltage V1 is supplied to the inverting amplifier 23 as an inverted reference voltage can be inverted to be supplied to the PWM comparator CMP2. As a result, a large amount of useless current is prevented from being supplied as a result of the output of pulses that turn on the switching device S2 at a timing in which the step-up switching device S2 (FIG. 1) is not required to be turned on.

Figure 6:
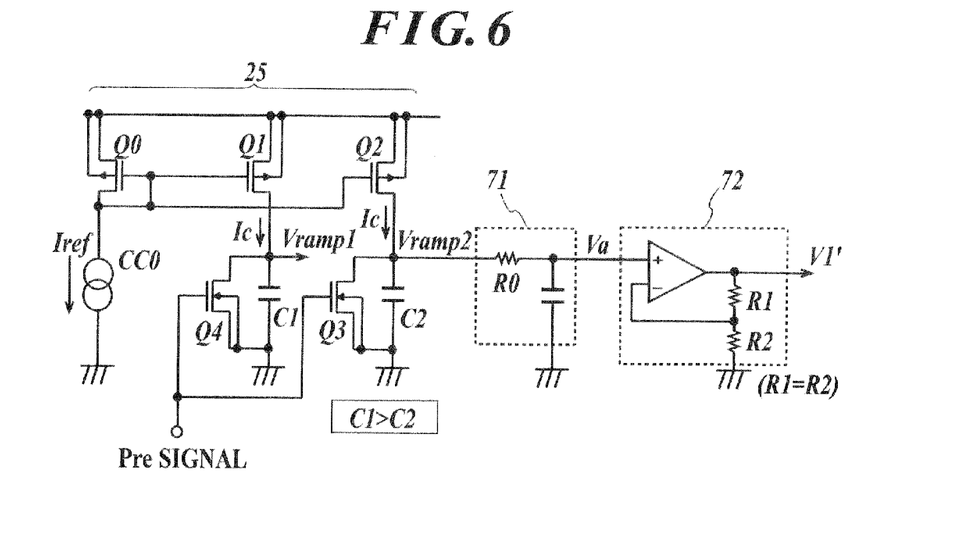
FIG. 6 is a circuit diagram illustrating a second example of a waveform (triangle wave) generator circuit of the peak-value detector circuit of an embodiment.

FIG. 6 illustrates a second specific example of the waveform generator circuit 25 generating triangle waves, the voltage averaging circuit 71, and the multiplying circuit 72. The voltage averaging circuit 71 and the multiplying circuit 72 are the same as those illustrated in FIG. 2.

The waveform generator circuit 25 according to this example includes a constant current source CC0 that supplies a reference current Iref, a P-channel MOS transistor Q0 that is connected in series with the constant current source CC0, P-channel MOS transistors Q1 and Q2 that are in common connection with the transistor Q0 at their gates, capacitive elements C1 and C2 connected to drain terminals of the transistors Q1 and Q2 and the grounding point, and N-channel MOS transistors Q4 and Q3 that are connected in parallel with the capacitive elements C1 and C2.

The transistors Q0 and Q1 and transistors Q0 and Q2 constitute current mirror circuits, respectively. In this example, the transistors Q1 and Q2 supply the same amount of current Ic. On the contrary, the capacitive element C2 is smaller than the capacitive element C1, i.e., C1>C2. The transistors Q4 and Q3 connected in parallel with the capacitive elements C1 and C2, respectively, are controlled by the same signal Pre. The signal Pre may be generated by a comparator that compares the voltage Vramp1 of the capacitive element C1 with the constant voltage V1, or may be generated using a signal from a circuit that determines the PWM control cycle.

Figure 7:
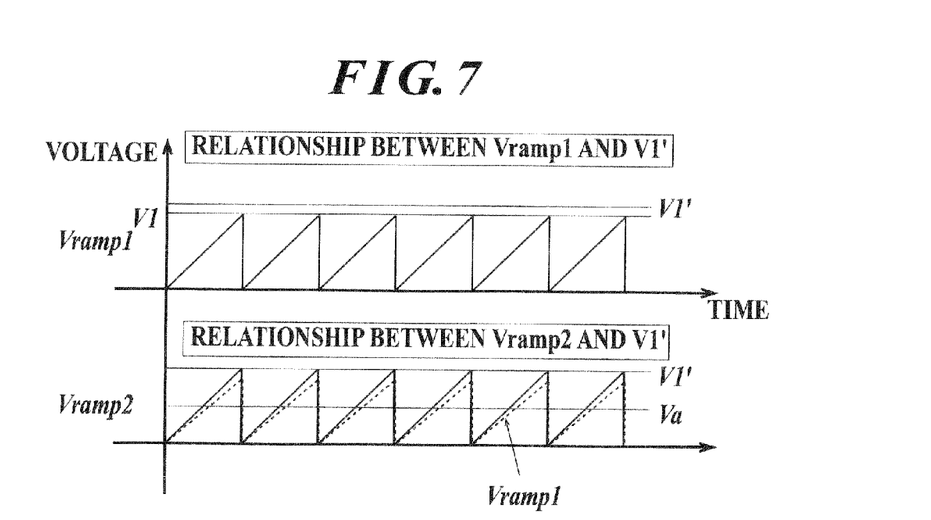
FIG. 7 is a waveform diagram illustrating an output waveform from the waveform (triangle wave) generator circuit of the second example.

As described above, the capacitive element C1 is larger than the capacitive element C2 and the capacitive elements C1 and C2 are charged for the same time interval by the same constant current Ic generated at the current mirror circuit; hence, the operation is carried out such that the voltage Vramp2 of the capacitive element C2 is higher than the Vramp1 of the capacitive element C1 as illustrated in FIG. 7. Thus, when the voltage Vramp2 is averaged at the averaging circuit 71 and the voltage V1' doubled at the multiplying circuit 72 is supplied as an inverted reference voltage to the inverting amplifier 23, the feedback voltage FB can be inverted based on a reference voltage with relatively high precision and supplied to the PWM comparator CMP2, compared to when the peak voltage V1 of the Vramp1 is supplied to the inverting amplifier 23 as an inverted reference voltage. As a result, a large amount of useless current is prevented from being supplied as a result of an output of a pulse that turns on the switching device S2 at a timing in which the step-up switching device S2 (FIG. 1) is not required to be turned on.

Detailed descriptions of the invention conceived by the inventors have been described based on the embodiments. The present invention, however, should not be limited to the embodiments. For example, in the waveform generator circuit according to the second example, the volume of the capacitive elements C1 and C2 are set to be C1>C2; the volume of the C1 and C2 may be set to be C1=C2, and the size of the transistors Q1 and Q2 of the current mirror circuit may be set such that Q2 is larger than Q1, i.e., Q1<Q2, such that the current of the Q2 is larger than the current of Q1, and such that the Vramp2 rises more quickly than the Vramp1. Furthermore, the size of the C1 and C2 may be set to be C1=C2, and the size of the transistor Q1 and Q2 may be set to be Q1=Q2, such that the size of the resistors R1 and R1 of the multiplying amplifier 72 satisfies (R1+R2)/R2>2.

This embodiment describes a DC-DC converter that supplies serrated waves as triangle waves to the PWM comparators (25, 26). Narrowly-defined triangle waves that have angled rising edges and angled falling edges may also be used.

INDUSTRIAL APPLICABILITY

In the description above, the present invention is applied to a step-up/down DC-DC converter. The present invention, however, should not be limited thereto and may be widely applied to DC-DC converters including waveform generator circuits that generate PWM triangle waves and requiring voltages corresponding to the peak values of the triangle waves.

DESCRIPTION OF REFERENCE NUMERALS 20 switching control circuit
21 error amplifier (error amplifier circuit)
22 first comparator (first voltage comparator circuit)
23 inverting amplifier (inverting amplifier circuit)
24 second comparator (second voltage comparator circuit)
25 waveform generator circuit
26 constant voltage circuit
27 peak-value detector circuit
71 voltage averaging circuit
72 multiplying circuit
L coil (inductor)
S1 switching device
S2 switching device

The invention claimed is:

1. A switching control circuit generating and outputting on/off signals of a first switching device supplying a current to a voltage conversion inductor of a step-up/down DC-DC converter and a second switching device receiving the current from the inductor, the switching control circuit comprising:
   an error amplifier circuit outputting a voltage corresponding to an output voltage of the DC-DC converter;
   an inverting amplifier circuit inverting the output from the error amplifier circuit with reference to a predetermined voltage;
   a waveform generator circuit generating triangle waves;
   a first voltage comparator circuit receiving the output from the error amplifier circuit and an output from the waveform generator circuit;
   a second voltage comparator circuit receiving an output from the inverting amplifier circuit and the output from the waveform generator circuit; and
   a peak-value detector circuit detecting a peak value of the triangle waves generated at the waveform generator circuit and supplying a voltage corresponding to the peak value to the inverting amplifier circuit as a reference voltage,
   wherein the peak-value detector circuit includes a voltage averaging circuit extracting an average voltage of the triangle waves generated at the waveform generator circuit and a multiplying circuit amplifying the voltage extracted by the voltage averaging circuit by a predetermined factor.

2. The switching control circuit according to claim 1, wherein the waveform generating circuit includes a constant current source, a first current mirror circuit and a second current mirror circuit supplying currents proportional to a constant current from the constant current source, a first capacitive element charged by a current from the first current mirror circuit, a second capacitive element charged by a current from the second current mirror circuit, first discharging means for discharging an electric charge in the first capacitive element, and second discharging means for discharging an electric charge in the second capacitive element,
wherein a waveform signal supplied to the first voltage comparator circuit and the second voltage comparator circuit is generated from a charging voltage of the first capacitive element, and a voltage corresponding to a peak value that is generated by supplying a charging voltage of the second capacitive element to the peak-value circuit is supplied to the inverting amplifier circuit as a reference voltage.

3. The switching control circuit according to claim 2, wherein the output current from the first current mirror circuit is identical to the output current from the second current mirror circuit, a capacitance of the second capacitive element is set to be smaller than a capacitance of the first capacitive element, and the peak value of the charging voltage of the second capacitive element supplied to the peak-value detector circuit is set to be larger than a peak value of the waveform signal supplied to the first voltage comparator circuit and the second voltage comparator circuit.

4. The switching control circuit according to claim 2, wherein a capacitance of the first capacitive element is identical to a capacitance of the second capacitive element, the output current of the first current mirror circuit is set to be smaller than the output current of the second current mirror circuit, and the peak value of the charging voltage of the second capacitive element supplied to the peak-value detector circuit is set to be higher than a peak value of the waveform signal supplied to the first voltage comparator circuit and the second voltage comparator circuit.

5. The switching control circuit according to claim 2, wherein:
   the output current from the first current mirror circuit is identical to the output current from the second current mirror circuit, and a capacitance of the second capacitive element is set to be identical to a capacitance of the first capacitive element,
   the multiplying circuit includes an operational amplifier receiving a voltage extracted by the voltage averaging circuit at a non-inverting input terminal and a divider circuit connected to an output terminal of the operational amplifier and a reference potential point, and
   the voltage divided at the divider circuit is applied to an inverting input terminal of the operational amplifier, and the input voltage to the operational amplifier is amplified to a voltage that is slightly higher than two times of the input voltage such that the peak value of the charging voltage of the second capacitive element supplied to the peak-value detector circuit is set to be larger than the a peak value of the waveform signal supplied to the first voltage comparator circuit and the second voltage comparator circuit.

6. A step-up/down DC-DC converter comprising:
   a voltage conversion inductor;
   a first switching device supplying a current to the inductor;
   a second switching device receiving a current from the inductor;
   a first rectifying device rectifying a current from the inductor while the first switching device is being turned off;
   a second rectifying device rectifying the current from the inductor while the second switching device is being turned off; and
   the switching control circuit according to claim 1 generating a signal for turning on/off the first and second switching device.

* * * * *